Patented Nov. 7, 1933

1,934,010

UNITED STATES PATENT OFFICE 1,934,010

WATERSOLUBLE FORMALDEHYDE BISULPHITE AMINO-ARYL ANTIMONY ARSENIC COMPOUND

Hans Schmidt, Elberfeld-Vohwinkel, Germany, assignor to Winthrop Chemical Company, Inc., New York, N. Y., a corporation of New York No Drawing. Application November 1, 1929, Serial No. 404,216, and in Germany November 6, 1928

5 Claims. (Cl. 260—11)

The present invention relates to new watersoluble derivatives of amino-aryl-antimony-arsenic compounds.

In accordance with the present invention stable watersoluble derivatives of amino-aryl-antimony-arsenic compounds are obtained by reacting upon an amino-aryl-antimony-arsenic compound with formaldehyde-bisulphite in aqueous solution. Instead of using formaldehyde-bisulphite said amino-aryl compounds may be acted upon first with formaldehyde and then with a suitable bisulphite. Amino-aryl-antimony-arsenic compounds suitable as starting materials for the purpose of the invention are for example, compounds of the probable general formula:

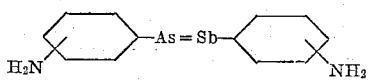

wherein the benzene nuclei may be further substituted by any monovalent substituents, such as hydroxyl groups, the urea-residue and the like.

Similar compounds which may be used as starting materials are the compounds of the probable formula:

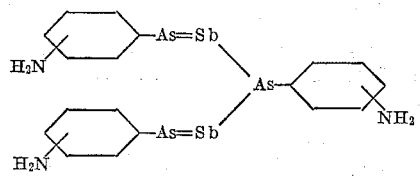

the benzene nuclei of which may be further substituted by monovalent substituents, for example, hydroxyl groups.

Other suitable starting materials are the amino substituted aromatic arsonic-stibinic acids, which may be represented by the following probable formula:

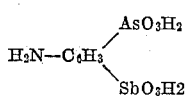

the benzene nucleus of which may be substituted, said compounds being obtainable by reduction for example, with ferrous hydroxide in alkaline solution of the nitro-group of the aromatic nitro-antimony-arsenic compounds prepared in accordance with the process described in Example 4 of German Patent 296,940, or finally there may be used as starting materials for the purpose of my invention reduction products obtainable from the compounds of the general formula:

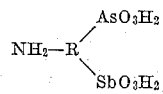

R meaning a substituted or unsubstituted benzene nucleus, the reduction products being obtainable according to the process described in German Patent 397,151. When starting from compounds containing salt forming groups it will be advantageous to use the compounds in the form of a watersoluble salt, for example, an alkali metal salt. The process may be carried out at various temperatures, room temperature or slightly elevated temperatures, say temperatures up to about 50° C. being mentioned by way of example. The solution is neutralized by the addition of an alkali, such as sodium carbonate, and the new compound is precipitated by pouring the solution into a precipitant, such as methylalcohol. In case oxidizable compounds are subjected to my new process, care is to be taken, that all operations are carried out with the exclusion of air as far as possible on account of the sensitivity to air of the starting- and end-products.

My new products thus obtainable are formaldehyde bisulphite derivatives of the amino-aryl-antimony-arsenic compounds used as starting materials. They are brownish colored powders, soluble in water, difficultly soluble in the usual organic solvents and are intended to be used for medicinal purposes in consequence of their solubility in water and their pharmaceutical activity.

The invention is illustrated by the following examples, without being limited thereto:

*Example 1.*—12 grams of 3-amino-4-hydroxy-4'-amino-1-arseno-1'-stibiobenzene of the probable formula:

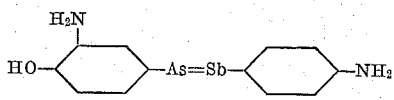

obtained by treating 4-aminophenyl stibinous chloride (hydrochloride) with 3-amino-4-hydroxyphenylarsine, in the freshly precipitated state are suspended in about 70 ccm. of water, just brought into solution by means of dilute hydrochloric acid, and a solution of 10 grams of formaldehyde-bisulphite in a little water is added. The solution is neutralized with dilute sodium carbonate solution and the turbid liquid is allowed to stand. After standing for some time clearing of the solution takes place. The solution is filtered, precipitated by pouring into methyl alcohol, the product formed is isolated and dried in a desiccator. All operations must be carried out with the exclusion of air as far as possible on account of the sensitivity to air of the intermediate- and end-products. A brown powder is obtained which is readily soluble in water with a neutral reaction.

Example 2.—12 grams of the stibio-arseno-compound of the probable formula:

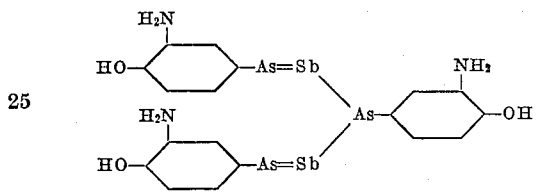

obtainable according to the process of German Patent No. 397,275 from 3-amino-4-hydroxy-1-phenyl-arsine and potassium antimony-1.2-dihydroxybenzene-3.5-disulphonate are suspended in the freshly precipitated state in about 70 ccm. of water, and 7 grams of formaldehyde-bisulphite, dissolved in a little water, are added. After standing for several days, solution takes place. The solution is filtered, neutralized with dilute caustic soda, the product formed is precipitated by pouring into methyl alcohol, isolated and dried in a desiccator. All operations are carried out with the greatest possible exclusion of air. A brown powder is obtained, which is readily soluble in water with a neutral reaction.

Example 3.—3-amino-4-urea-3'-amino-4'-hydroxy-1-stibio-1'-arsenobenzene (prepared from 4.9 grams of 3-amino-4-hydroxy-phenylarsine and 8 grams of 3-amino-4-urea-phenyl stibinous chloride (hydrochloric acid salt) freshly prepared and obtained in form of a paste is dissolved in a small quantity of water with 17 ccm. of normal hydrochloric acid, and 3.8 ccm. of a 40% aqueous formaldehyde solution are added whereupon the solution solidifies to form a jelly. After a short time 3.8 grams of sodium bisulphite are added and the mixture is neutralized by the addition of an aqueous sodium carbonate solution. The reaction mixture which has become thinly liquid again is allowed to stand for some time. Then it is filtered, the filtrate is again neutralized by the addition of an aqueous sodium carbonate solution and the new complex compound formed is precipitated by stirring the reaction mixture into methyl alcohol. After isolating and drying the new formaldehyde-bisulphite derivative of 3-amino-4-urea-3'-amino-4'-hydroxy-1-stibio-1'-arseno-benzene is obtained in form of a brownish powder, easily soluble in water. All operations are carried out with the greatest possible exclusion of air.

I claim:

1. The formaldehyde-bisulphite derivatives of compounds of the probable formula:

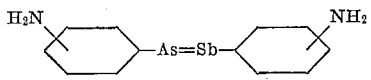

wherein the benzene nuclei may be further substituted by monovalent substituents, said products being brownish powders, easily soluble in water, rather difficultly soluble in the usual organic solvents, displaying a therapeutic action.

2. The formaldehyde-bisulphite derivatives of compounds of the probable formula:

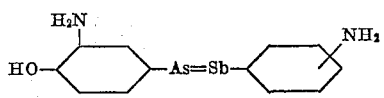

wherein the benzene nucleus linked to the antimony atom may be further substituted by a hydroxy group, said products being brownish powders, easily soluble in water, rather difficultly soluble in the usual organic solvents, displaying a therapeutic action.

3. A formaldehyde-bisulphite derivative of the compound of the probable formula:

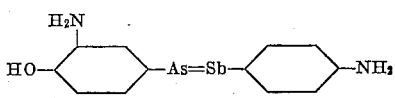

said product being a brownish powder, easily soluble in water, rather difficultly soluble in the usual organic solvents, displaying a therapeutic action.

4. A formaldehyde-bisulphite derivative of the compound of the probable formula:

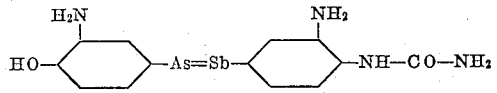

said product being a brownish powder, easily soluble in water, rather difficultly soluble in the usual organic solvents, displaying a therapeutic action.

5. A formaldehyde-bisulphite derivative of the compound of the probable formula:

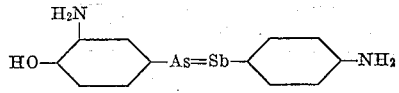

said product being a brownish powder, easily soluble in water, rather difficultly soluble in the usual organic solvents, displaying a therapeutic action.

HANS SCHMIDT.